(12) United States Patent
Hatakeyama et al.

(10) Patent No.: US 7,424,184 B2
(45) Date of Patent: Sep. 9, 2008

(54) OPTICAL MEMBER AND OPTICAL COMMUNICATION MODULE WITH EASY HEIGHT ADJUSTMENT

(75) Inventors: Shigeru Hatakeyama, Fukushima-ken (JP); Kazuhiro Konno, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 11/784,324

(22) Filed: Apr. 5, 2007

(65) Prior Publication Data

US 2007/0242943 A1 Oct. 18, 2007

(30) Foreign Application Priority Data

Apr. 14, 2006 (JP) .............................. 2006-111466

(51) Int. Cl.
*G02B 6/32* (2006.01)

(52) U.S. Cl. ........................................................ 385/33

(58) Field of Classification Search ........................ None
See application file for complete search history.

(56) References Cited

U.S. PATENT DOCUMENTS

| | | | | | |
|---|---|---|---|---|---|
| 5,412,506 | A | * | 5/1995 | Feldblum et al. | 359/569 |
| 5,568,318 | A | * | 10/1996 | Leger et al. | 359/618 |
| 6,014,260 | A | * | 1/2000 | Godard et al. | 359/619 |
| 6,603,148 | B1 | * | 8/2003 | Sano et al. | 257/98 |
| 6,721,511 | B1 | | 4/2004 | Tatsuno et al. | |
| 7,121,741 | B2 | | 10/2006 | Furuta et al. | |
| 2002/0131728 | A1 | * | 9/2002 | Kovalchick | 385/90 |
| 2004/0141710 | A1 | * | 7/2004 | Kishida et al. | 385/140 |
| 2006/0249661 | A1 | * | 11/2006 | Ishigami et al. | 250/216 |

* cited by examiner

*Primary Examiner*—Sung Pak
*Assistant Examiner*—Mike Stahl
(74) *Attorney, Agent, or Firm*—Beyer Law Group LLP

(57) ABSTRACT

An optical member includes a body made of an optical material and formed in a square sectional shape, and a lens disposed on at least one end face of the body so that the distances from the lens center to each of the side faces of the body are all different. The optical member is incorporated in an optical communication module as a component for coupling light from a light-emitting device to the end face of an optical fiber.

3 Claims, 2 Drawing Sheets

OPTICAL MEMBER AND OPTICAL COMMUNICATION MODULE WITH EASY HEIGHT ADJUSTMENT

BACKGROUND OF THE INVENTION

1. Field of the Invention

The present invention relates to an optical member having lenses and an optical communication module using the same, and more specifically to an optical member usable for plane mounting and an optical communication module using the same.

2. Description of the Related Art

In an optical communication module, a lens is used for coupling light from a light-emitting device to an optical fiber. The lens, normally having a circular shape, is usually disposed at a V-shaped groove formed on a silicon substrate on which the light-emitting device is provided, since the lens should be positioned so as to match the level of the light-emitting device. An example of such an optical communication module is presented in Japanese Unexamined Patent Application Publication No. 2000-12183.

In a configuration in which a lens is disposed on a silicon substrate, the lens has to be fixed at an accurate position relative to the silicon substrate; the position adjustment for such a configuration has been a difficult task. Another problem with the configuration has been that the use of a silicon substrate inhibits miniaturization of the optical communication module. A known example of an optical member, devised to solve the above problems, consists of a rectangular columnar body and lenses provided thereon; the optical member is directly fixed on a substrate on which a light-emitting device is disposed, and receives light from the light-emitting device.

FIG. 4 shows a front view of a conventional optical member. The conventional optical member 50 is formed, as shown in the figure, by disposing a first lens 52 and a second lens 53 both having a convex shape on each end face of a body 51 having a substantially square sectional shape. Since the first and second lenses 52, 53 are disposed so that their center positions 60 are collinear, and coincident with the center position of each end face of the body 51, whichever side face of the body 51 becomes the underside, the height of the center positions 60 of the first and second lenses 52, 53 is maintained constant.

Even in this case, however, a deviation in the height of the light emitting point of a light-emitting device occurs, so it becomes necessary to adjust the height of the center positions 60 of the first and second lenses 52, 53 to match the height of the light emitting point of the light-emitting device. The height of the rectangular columnar body 51 is adjusted by shaving the side face thereof or by disposing a height adjustment spacer, which is a time-consuming job and becomes a factor of cost up.

SUMMARY OF THE INVENTION

The present invention addresses the above problem with the object to provide an optical member that can be easily adjusted in the height direction, and an optical communication module using the same.

To solve the above problem, an optical member according to the present invention is formed by providing a lens to at least one of the end faces of a rectangular columnar body made of an optical material, the lens being disposed so that the center position thereof deviates from the end face center position of the body.

The optical member of the present invention has a configuration such that the distances from the lens center position to each of the four side faces of the body are all different.

The optical member of the present invention is unique in that the body has a beveled portion formed at a corner between two adjacent side faces thereof.

The optical member of the present invention is also unique in that the body has a square sectional shape.

Next, an optical communication module according to the present invention includes, on a substrate, a light-emitting device emitting light, an optical fiber receiving light emitted from the light-emitting device at its end face, and an optical member coupling light from the light-emitting device to the end face of the optical fiber, the optical member being formed according to one of the aspects of the present invention.

In the optical member of the present invention, because the lens is disposed so that the center position thereof deviates from the end face center position of the rectangular columnar body, it is possible to vary the level of the lens center position merely by changing the side face of the body becoming the underside when mounting it on the substrate;

thus, the position of the lens can be easily adjusted in the height direction.

In the optical member of the present invention, since the distances from the lens center position to each of the four side faces of the body are all different, four patterns of adjusting the height position become available for the lens, which enables the height adjustment to be performed more precisely and with a broad coverage.

In the optical member of the present invention, the height position pattern of the lens can be easily determined, because the beveled portion formed at a corner between adjacent side faces of the body allows the orientation of the body to be easily determined.

In the optical member of the present invention, due to the symmetrical shape of the body formed in a square sectional shape, the body can be readily formed of an optical material with accuracy.

By using the above optical member provided by the present invention, the optical communication module including, on the substrate, the light-emitting device emitting light, the optical fiber receiving light emitted from the light-emitting device at its end face, and the optical member coupling light from the light-emitting device to the end face of the optical fiber, can have an advantage that the position of the optical member is easily adjusted in the height direction.

DESCRIPTION OF THE PREFERRED EMBODIMENTS

An embodiment of the present invention will be described with reference to the figures. A side view and a front view of an optical member in this embodiment are respectively shown in FIGS. 1 and 2. As shown in each figure, an optical member 1 in this embodiment consists of a body 2 formed substantially in a rectangular column shape and convex shaped lenses 3, 4 respectively formed on the end faces 10, 11 of the body 2.

Figure 1:
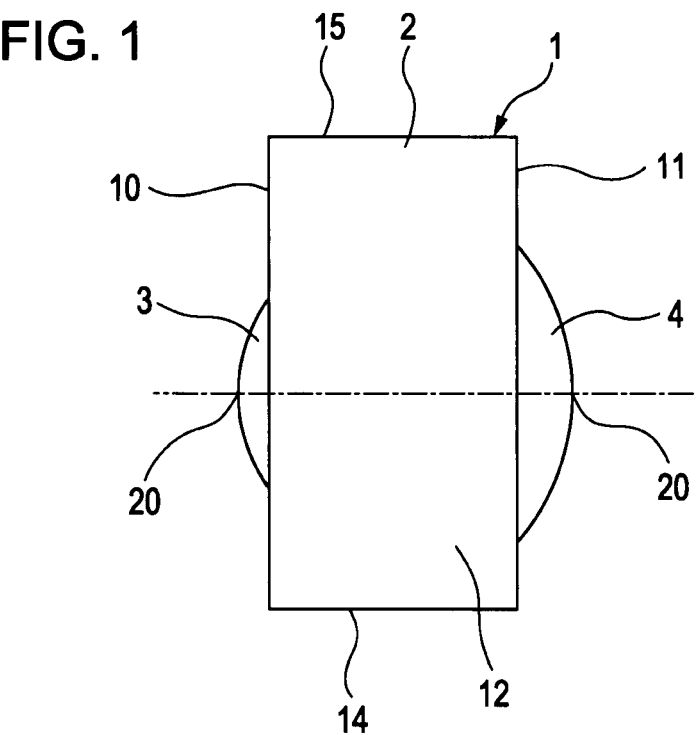
FIG. 1 is a side view of an optical member in this embodiment.

As shown in FIG. 1, the first lens 3 is formed on one end face 10 of the body 2, and the second lens 4 is formed on the other end face 11 of the body 2. The first and second lenses 3, 4 are disposed so that their center positions 20 are collinear at respective end faces 10, 11 of the body 2. The first lens 3 is formed to be smaller in diameter than the second lens 4; thereby, diverged light incident to the first lens 3 is emitted from the second lens 4 as converged light.

Figure 2:
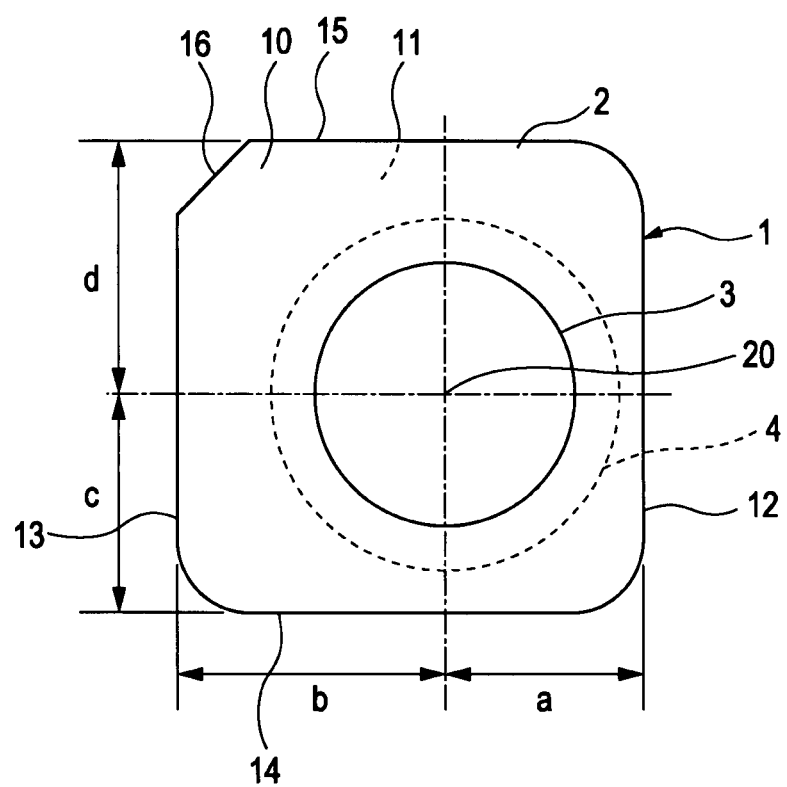
FIG. 2 is a front view of an optical member in this embodiment.

Because of being formed substantially in a rectangular column shape, the body 2 has four side faces 12, 13, 14, 15 besides the end faces 10, 11, which are shaped substantially in a square as shown in FIG. 2. The first and second lenses 3, 4 are disposed so that their center positions 20 are deviated from each center position of the end faces 10, 11 of the body 2.

Since the center positions 20 of the first and second lenses 3, 4 are deviated from each center position of the end faces 10, 11, the distances from the center positions 20 to respective side faces 12, 13, 14, 15 of the body 2 are all different. That is, the distance from the center positions 20 to the side face 12 is "a", the distance from the center positions 20 to the side face 13 is "b", the distance from the center positions 20 to the side face 14 is "c", and the distance from the center positions 20 to the side face 15 is "d"; "a", "b", "c" and "d" have different values.

Therefore, the distance from the center positions 20 of the lenses 3, 4 to the plane on which the optical member 1 is placed becomes "a" when the side face 12 of the body 2 is the underside, "b" when the side face 13 is the underside, "c" when the side face 14 is the underside, and "d" when the side face 15 is the underside. Namely, the level of the center positions 20 of the lenses 3, 4 can be varied depending on which side face of the body 2 is the underside. Accordingly, it becomes possible to perform the height adjustment of the lenses 3, 4 merely by changing the orientation of the optical member 1.

As shown in FIG. 2, the body 2 is formed so as to have the end faces 10, 11 shaped substantially in a square, three of four corner portions chamfered in an arc shape, and the remaining one corner portion chamfered flatly as a beveled portion 16. The beveled portion 16 provided at one of the corner portions enables the orientation of the optical member 1 to be easily recognized.

Furthermore, since the body 2 is formed so as to have a substantially square sectional shape, i.e., to be symmetrical with respect to the centerline, the optical member 1 can be readily formed with accuracy when made of an optical material.

Figure 3:
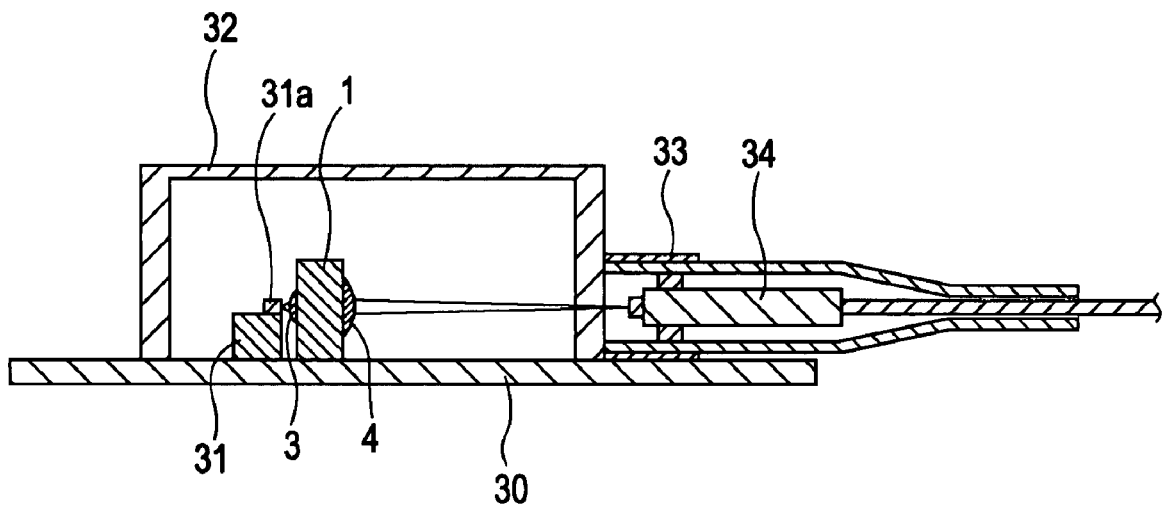
FIG. 3 is a sectional overview of an optical communication module.
Figure 4:
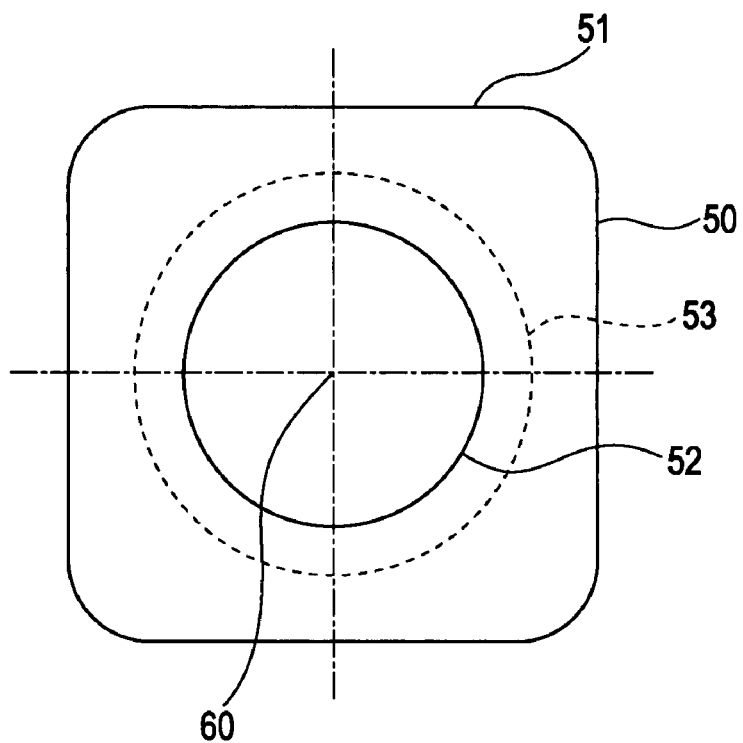
FIG. 4 is a front view of a conventional optical member.

Next, an optical communication module using the optical member 1 of this embodiment will be described. A sectional overview of the optical communication module is shown in FIG. 3. As shown in this figure, the optical communication module has a light-emitting device 31, the optical member 1, and a housing 32 covering these components disposed on a substrate 30; the housing 32 has a fiber fixing portion 33 projected from one of its side faces, the fiber fixing portion 33 for fixing an optical fiber 34.

The light-emitting device 31 has a light-emitting point 31a, from which laser light is emitted. The optical member 1 is disposed so that the center positions 20 of the first and second lenses 3, 4 are at the same level as the light-emitting point 31a. The laser light emitted from the light-emitting point 31a of the light-emitting device 31 is a diverged light, which is incident on the first lens 3 of the optical member 1 and emitted from the second lens 4 as a converged light; the emitted light is coupled to the end face of the optical fiber 34.

Because the height of the light-emitting point 31a from the bottom of the light-emitting device 31 deviates depending on the devices, it is necessary to adjust the height of the optical member 1 according to the deviation. As described above, the lenses 3, 4 are disposed so that the center position 20 of each of them deviates from each center position of the end faces 10, 11 of the body 2, so the height of the center position 20 of each of the lenses 3, 4 can be easily varied by changing the orientation of the optical member 1. It becomes possible, therefore, to perform appropriate adjustment of the height of the center positions 20 of the lenses 3, 4 to match the height of the light-emitting point 31a by setting so that the distances from the center positions 20 of the lenses 3, 4 to the respective side faces of the body 2 fall within the range of deviation in height of the light-emitting point 31a.

While a preferred embodiment of the present invention has been described above, the application of the present invention is not limited to this embodiment, but should be available in various ways within the technological scope. In this embodiment, the application of the optical member to the optical communication module is presented, but the optical member according to the present invention should also be used for other apparatuses. Although an example of the body having a lens on each of its end faces is illustrated in this embodiment, the lens may be provided on either face end of the body. Additionally, although the optical member is configured in this embodiment so that the distances from the lens center to each of the four side faces of the body are all different, it is also possible to make the distances from the lens center to two opposite faces of the four side faces of the body equal, by which two patterns of the distance from the lens center to the side faces of the body are obtained. It is preferable, however, to have four different distances, which increase patterns of height adjustment.

What is claimed is:

1. An optical member, comprising:
a substantially rectangular columnar body made of an optical material, the body being formed in a substantially square sectional shape, the body having a lens on at least one end face thereof,
wherein the lens is disposed so that its center position deviates with respect to the center position of an end face of the body,
wherein the lens is disposed so that the distances from the center position thereof to each of four side faces of the body are all different,
and wherein three of four corner portions between the side faces are chamfered in an arc shape, and the remaining one corner portion is chamfered flatly as a beveled portion.

2. An optical communication module having a light-emitting device emitting light, an optical fiber receiving the light emitted from the light-emitting device at its end face, and an optical member coupling the light from the light-emitting device to the end face of the optical fiber, on a substrate,
wherein the optical member is that described in claim 1.

3. The optical member according to claim 1, wherein the lens is disposed so that its center position deviates with respect to the center position of the end face of the body in a direction away from a flatly chamfered beveled portion of the body.

* * * * *